(12) United States Patent
Xiong

(10) Patent No.: US 10,707,746 B1
(45) Date of Patent: Jul. 7, 2020

(54) POWER CONVERTER WITH INDEPENDENT MULTIPLIER INPUT FOR PFC CIRCUIT

(71) Applicant: UNIVERSAL LIGHTING TECHNOLOGIES, INC., Madison, AL (US)

(72) Inventor: Wei Xiong, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

(21) Appl. No.: 16/423,880

(22) Filed: May 28, 2019

Related U.S. Application Data

(60) Provisional application No. 62/678,358, filed on May 31, 2018.

(51) Int. Cl.
*H02M 1/42* (2007.01)
(52) U.S. Cl.
CPC ....... *H02M 1/4208* (2013.01); *H02M 1/4225* (2013.01)
(58) Field of Classification Search
CPC ..... H02M 1/42; H02M 1/4208; H02M 1/4225
See application file for complete search history.

(56) References Cited

U.S. PATENT DOCUMENTS

| | | | |
|---|---|---|---|
| 6,154,375 A | 11/2000 | Majid et al. | |
| 6,323,604 B1 | 11/2001 | Boenigk et al. | |
| 8,129,958 B2 * | 3/2012 | Ku | H02M 1/4225 323/207 |
| 8,406,020 B2 * | 3/2013 | Chiba | H02M 1/4208 363/127 |
| 8,421,363 B2 | 4/2013 | Li | |
| 8,804,382 B2 | 8/2014 | Stone et al. | |
| 8,947,015 B1 * | 2/2015 | Xiong | H05B 41/3924 315/224 |
| 9,237,621 B1 * | 1/2016 | Xiong | H05B 33/0851 |
| 9,350,260 B2 | 5/2016 | Dai et al. | |
| 9,370,061 B1 * | 6/2016 | Xiong | H05B 33/0815 |
| 9,674,907 B1 | 6/2017 | Xiong et al. | |
| 9,735,686 B2 | 8/2017 | Adragna et al. | |
| 9,769,890 B1 | 9/2017 | Xiong et al. | |
| 10,158,282 B1 * | 12/2018 | Maruyama | H02M 1/36 |
| 2005/0068796 A1 * | 3/2005 | Morita | H02M 1/4225 363/120 |

(Continued)

*Primary Examiner* — Fred E Finch, III
*Assistant Examiner* — Rafael O. De León Domenech
(74) *Attorney, Agent, or Firm* — Patterson Intellectual Property Law, P.C.; Gary L. Montle; Alex H. Huffstutter

(57) ABSTRACT

A power supply for providing power to a load includes a main rectifier having first and second rectifier input terminals coupled to an alternating current (AC) power source, which converts AC power from the AC power source into a first direct current (DC) power signal at first and second rectifier output terminals, across which an energy storage device is coupled. A DC-DC power converter (e.g., a PFC circuit) comprises an integrated circuit (IC) and converts the first DC power signal into a second DC power signal in response to a multiplier signal received at a multiplier input of the IC. A multiplier input circuit as disclosed herein is coupled to the first and second rectifier input terminals and provides the multiplier signal to the multiplier signal input terminal, wherein the multiplier input circuit is decoupled from the energy storage device via the main rectifier.

15 Claims, 8 Drawing Sheets

(56) References Cited

U.S. PATENT DOCUMENTS

| | | |
|---|---|---|
| 2006/0061337 A1* | 3/2006 | Kim ............... G05F 1/70 323/205 |
| 2006/0290388 A1 | 12/2006 | Tolle et al. |
| 2007/0230228 A1 | 10/2007 | Mao |
| 2009/0231776 A1 | 9/2009 | Kramer et al. |
| 2010/0308733 A1* | 12/2010 | Shao ............... H02M 1/4225 315/119 |
| 2011/0148313 A1 | 6/2011 | Ramaker |
| 2011/0267856 A1* | 11/2011 | Pansier ............... H02M 1/4225 363/84 |
| 2012/0075889 A1* | 3/2012 | Sasaki ............... H02M 1/4225 363/21.09 |
| 2012/0139432 A1 | 6/2012 | Mancho-Banuls et al. |
| 2012/0200230 A1 | 8/2012 | Esaki et al. |
| 2012/0223667 A1 | 9/2012 | Wang et al. |
| 2012/0230059 A1 | 9/2012 | Adragna et al. |
| 2012/0262086 A1 | 10/2012 | Feldtkeller |
| 2013/0063186 A1 | 3/2013 | DeBeer et al. |
| 2013/0201731 A1* | 8/2013 | Gu ............... H02M 1/4225 363/21.17 |
| 2014/0085764 A1 | 3/2014 | Huo et al. |
| 2014/0313790 A1 | 10/2014 | Feng et al. |
| 2015/0318778 A1 | 11/2015 | Gong et al. |
| 2016/0141951 A1* | 5/2016 | Mao ............... H02M 1/36 363/21.02 |
| 2016/0141964 A1* | 5/2016 | Yu ............... H02M 3/33507 363/21.02 |
| 2016/0149504 A1 | 5/2016 | Quigley |
| 2016/0164430 A1* | 6/2016 | Chen ............... H02M 1/32 363/89 |
| 2016/0190912 A1* | 6/2016 | Lim ............... G01R 21/006 363/84 |
| 2016/0261199 A1* | 9/2016 | Adragna ............ H02M 3/33523 |
| 2018/0175735 A1 | 6/2018 | Zhao et al. |
| 2018/0287601 A1 | 10/2018 | Yang et al. |

* cited by examiner

POWER CONVERTER WITH INDEPENDENT MULTIPLIER INPUT FOR PFC CIRCUIT A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application which is hereby incorporated by reference: U.S. Provisional Patent Application No. 62/678,358 filed May 31, 2018, entitled "Power Converter with Independent Multiplier Input for PFC Circuit."

FIELD OF THE INVENTION

The present disclosure relates generally to two-stage power supply circuits having a power factor correction circuit as a first stage and a DC-DC converter as a second stage. More particularly, the disclosure pertains a portion of the power factor correction circuit referred to herein as a multiplier circuit.

BACKGROUND

A typical power supply circuit receives power from an AC source, such as for example a conventional mains input. During a normal mode of operation, the power supply circuit generates either a constant voltage or a constant current to a DC load. A first-stage power factor correction (PFC) circuit is known to maintain the current drawn from the AC source substantially in phase with the voltage of the AC source. The PFC circuit provides a high power factor and a stiff first-stage output voltage to a second-stage DC-to-DC converter circuit. The second-stage DC-to-DC converter circuit regulates the constant voltage or the constant current for the DC load to meet an output performance requirement.

The PFC circuit may be based on various topologies. One such topology is a boost converter. Another such topology is a flyback converter. Although both types of converters can be used in a PFC circuit, a PFC converter based on a boost converter topology typically can achieve a greater power factor (e.g., closer to 1) than a PFC converter based on a flyback topology.

PFC circuits are typically coupled across an output rectifier filter capacitor between the output terminals of a rectifier and are configured to receive DC voltage. When the DC load coupled to the PFC circuit is heavy, the PFC circuit may function optimally in a critical conduction mode. When the DC load coupled to the PFC circuit is light, the PFC circuit may function in a pulsing mode. The pulsing mode is generally due to an inability of the output rectifier filter capacitor being able to fully discharge during an off time of an electronic switch of the PFC circuit. Unfortunately, in LED driver applications the pulsing mode is highly undesirable because an LED load is very sensitive to variations in the voltage, and as a result the LEDs might flicker.

BRIEF SUMMARY

A need exists for improving a functionality of PFC circuits when a DC load coupled to the PFC circuit is light enough to cause the PFC circuit to function in a pulsing mode. The present disclosure provides an improved multiplier circuit independent (e.g., decoupled) from the rectifier filter capacitor. The improved multiplier circuit is configured to generate an independent multiplier signal which is forced to follow an input voltage waveform of an AC power source. The independent multiplier circuit forces the PFC circuit into a regular pulsing mode when the DC load coupled to the PFC circuit is light. The regular pulsing mode of the PFC circuit dramatically improves the stability of the second stage control loop (e.g., a DC-DC convertor circuit). The regular pulsing of the PFC circuit will also improve the electromagnetic interference (EMI) emission of the overall circuit.

In one exemplary embodiment of a power supply as disclosed herein, the power supply comprises a main rectifier having first and second rectifier input terminals coupled to an alternating current (AC) power source, which converts AC power from the AC power source into a first direct current (DC) power signal at first and second rectifier output terminals, across which an energy storage device is coupled. A DC-DC power converter comprises an integrated circuit (IC) and converts the first DC power signal into a second DC power signal in response to a multiplier signal received at a multiplier input of the IC. A multiplier input circuit as disclosed herein is coupled to the first and second rectifier input terminals and provides the multiplier signal to the multiplier signal input terminal, wherein the multiplier input circuit is decoupled from the energy storage device via the main rectifier.

In one exemplary aspect of the aforementioned embodiment, the multiplier signal corresponds to the AC power from the AC power source independently of a load condition.

In another exemplary aspect, the DC-DC power converter may be a power factor correction (PFC) circuit comprising an inductor coupled on a first end to a first end of the energy storage device, and a switching element coupled between a second end of the inductor and the second rectifier output terminal.

In another exemplary aspect, the multiplier input circuit forces the PFC circuit into a regular pulsing mode when the load is under light load conditions typically associated with a random pulsing mode.

In an embodiment, the multiplier input circuit includes a second rectifier coupled across the first and second rectifier input terminals of the main rectifier. First and second input voltage divider resistors are coupled in series between first and second outputs of the second rectifier, wherein the first and second input voltage divider resistors are coupled together at a common node. The common node may be coupled to the multiplier input of the IC.

In another exemplary embodiment, the multiplier input circuit includes a first diode coupled between the first rectifier input terminal of the main rectifier and a first node, a second diode coupled between the second rectifier input terminal of the main rectifier and the first node. A first input voltage divider resistor and a second input voltage divider resistor are further coupled in series between the first node and the second rectifier output terminal of the main rectifier, with the first and second input voltage divider resistors coupled together at a second node. The second node may be coupled to the multiplier input of the IC.

In another exemplary embodiment, the multiplier input circuit includes a first input voltage divider resistor coupled between the first rectifier input terminal of the main rectifier and a common node of the multiplier circuit. A second input voltage divider resistor is coupled between the common node and the second rectifier output terminal of the main rectifier, and a third input voltage divider resistor is coupled between the second rectifier input terminal of the main rectifier and the common node. The common node may be coupled to the multiplier input of the IC.

In one aspect of the aforementioned embodiment, the first and second voltage divider resistors may operate as a voltage divider during a positive half-cycle of the AC power from the AC power source, and the second and third voltage divider resistors may operate as the voltage divider during a negative half-cycle of the AC power from the AC power source.

In another exemplary embodiment, a second DC-DC power converter may be coupled to receive the second DC power signal and configured to produce a regulated third DC power signal at an output of the power supply, responsive to a target DC power output. The output of the power supply may be coupled via first and second output terminals to a lighting module comprising one or more light emitting diodes.

DETAILED DESCRIPTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

The following detailed description of embodiments of the present disclosure refers to one or more drawings. Each drawing is provided by way of explanation of the present disclosure and is not a limitation. Those skilled in the art will understand that various modifications and variations can be made to the teachings of the present disclosure without departing from the scope of the disclosure. For instance, features illustrated or described as part of one embodiment can be used with another embodiment to yield a still further embodiment.

The present disclosure is intended to cover such modifications and variations as come within the scope of the appended claims and their equivalents. Other objects, features, and aspects of the present disclosure are disclosed in the following detailed description. One of ordinary skill in the art will understand that the present discussion is a description of exemplary embodiments only and is not intended as limiting the broader aspects of the present disclosure.

Figure 1:
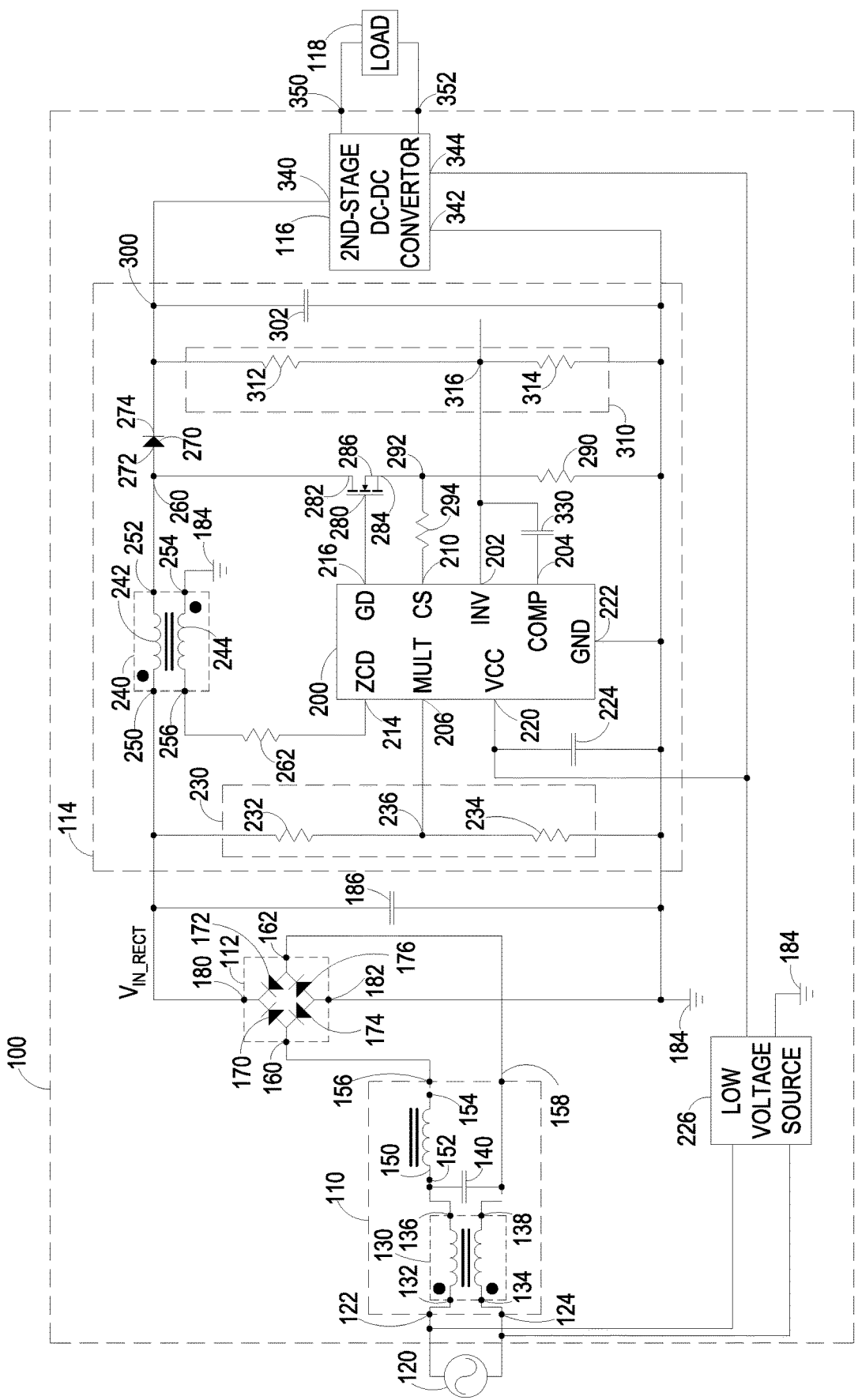
FIG. 1 illustrates a topology of a typical conventional two-stage electronic switching power supply.

FIG. 1 illustrates a topology of a typical conventional two-stage electronic switching power supply 100. The power supply includes four general blocks—an EMI control circuit 110, a rectifier circuit 112, a first-stage circuit 114, and a second-stage circuit 116. As described below, the first-stage circuit is a power factor correction (PFC) circuit. In the illustrated embodiment, the second stage circuit is a DC-DC convertor circuit. The rectifier circuit 112 may be referred to herein as a main rectifier 112. The second-stage circuit provides power to a DC load 118, which may be, for example, a plurality of interconnected light-emitting diodes (LEDs).

An AC source 120 provides AC power across a first (line) input 122 and a second (neutral) input 124 of the EMI control circuit 110. In particular, the line input is connected to a conventional line conductor of the AC source, and the neutral input is connected to a conventional neutral conductor of the AC source. The connections may be accomplished by hardwiring connections to the AC source or by inserting an AC plug into an AC outlet.

The EMI control circuit 110 comprises a common mode EMI choke 130 having a first input 132 connected to the line input 122 from the AC source 120 and having a second input 134 connected to the neutral input 124 from the AC source. The common mode EMI choke has a first output 136 and a second output 138. An X-type EMI filter capacitor 140 is connected between the first output and the second output of the common mode EMI choke. The first output of the common mode EMI choke is connected to a first terminal 152 of a differential mode EMI inductor 150. A second terminal 154 of the differential mode EMI inductor is connected to a first EMI circuit output terminal 156. The second output of the common mode EMI choke is connected to a second EMI circuit output terminal 158.

The AC power passes through the EMI control circuit 110 and is provided across a first input terminal 160 and a second input terminal 162 of the rectifier circuit 112. The rectifier circuit is configured as a full-wave bridge rectifier circuit that comprises a first rectifier diode 170, a second rectifier diode 172, a third rectifier diode 174, and a fourth rectifier diode 176, which are connected as shown.

The first input terminal 160 of the rectifier circuit 112 is connected to the anode of the first rectifier diode 170 and to the cathode of the third rectifier diode 174. The second input terminal 162 of the rectifier circuit is connected to the anode of the second rectifier diode 172 and to the cathode of the fourth rectifier diode 176.

The cathodes of the first rectifier diode 170 and the second rectifier diode 172 are commonly connected to a positive voltage output terminal 180 of the rectifier circuit 112. The anodes of the third rectifier diode 174 and the fourth rectifier diode 176 are commonly connected to a reference voltage output terminal 182, which is connected to a local circuit ground connection 184. A rectifier output filter capacitor 186 is connected between the positive voltage output terminal and the reference voltage output terminal of the rectifier circuit. The rectifier circuit generates a full-wave rectified output voltage across the rectifier output filter capacitor in a conventional manner to convert AC power from the AC source 120 into an instantaneous rectified input voltage ($V_{IN\_RECT}$) to be supplied across the positive voltage output terminal 180 and the reference voltage output terminal 182.

The first-stage circuit ("PFC circuit") 114 in FIG. 1 is configured as a boost converter operating in the critical conduction mode. The PFC circuit is coupled across the filter capacitor 186 between the positive voltage output terminal 180 and the reference voltage output terminal 182 of the rectifier 112. The PFC circuit includes a power factor corrector integrated circuit (PFC IC) 200. In the illustrated embodiment, the PFC IC comprises an L6561 PFC IC, which is commercially available from STMicroelectronics of Geneva, Switzerland. Other power factor corrector integrated circuits from the same manufacturer or from other manufacturers may also be incorporated into the PFC circuit.

The PFC IC 200 includes an inverting (INV) input 202 connected to an internal error amplifier, a compensation (COMP) output 204 connected to an output of the internal error amplifier, a multiplier (MULT) input 206 connected to an internal multiplier stage, a current sensing (CS) input 210 connected to an internal comparator of an internal control loop, a zero current detection (ZCD) input 214 connected to an internal zero current detector, and a gate driver (GD) output 216 connected to an internal push-pull output stage.

The PFC IC 200 further includes a supply voltage (VCC) input 220 that provides power to the IC. A ground return (GND) output 222 completes the power connection and provides a ground reference (e.g., the local circuit ground connection 184) for signals received and generated by the IC. The supply voltage input is connected to a low voltage source 226 that provides the DC voltage for the operation of the PFC IC. In the illustrated embodiment, the low voltage source receives AC power from the AC source 120. In other embodiments, the low voltage source may be coupled to receive the rectified DC voltage produced by the rectifier circuit 112. For example, the low voltage source may include a linear voltage regulator that provides a substantially constant DC voltage over a wide range of input voltages. The low voltage source may also be a battery.

As further shown in FIG. 1, the PFC circuit 114 further includes a multiplier circuit 230 coupled across the rectifier output filter capacitor 186 between the positive voltage output terminal 180 of the rectifier 112 and the local circuit ground connection 184, and to multiplier (MULT) input 206 of the PFC IC 200. The multiplier circuit 230 includes a first input voltage divider resistor 232 and a second input voltage divider resistor 234 connected in series between the positive voltage output terminal 180 from the rectifier circuit 112 and the local circuit ground connection 184. The two resistors are connected at a common node 236 to provide a voltage proportional to the time-varying output voltage from the rectifier circuit. The first and second input voltage divider resistors 232, 234 sense the voltage across the rectifier output filter capacitor 186 and provide a multiplier signal ($V_{MULT}$) to the multiplier (MULT) input 206 of the PFC IC 200. The multiplier signal ($V_{MULT}$) is the voltage at the common node 236. The common node is connected to the multiplier (MULT) input 206 of the PFC IC 200, which uses the input signal to control the timing of output signals to thereby control the power factor.

The PFC circuit 114 further includes a boost inductor 240 having a main winding 242 and an auxiliary winding 244. The main winding has a first terminal 250 and a second terminal 252. The auxiliary winding has a first terminal 254 and a second terminal 256. As noted by the dot convention on the windings, the two windings are mutually coupled, and the respective first terminals of the two windings are in phase.

The first terminal 250 of the main winding of the boost inductor 240 is connected to the positive reference voltage output terminal 180 of the rectifier circuit 112. The second terminal 252 of the main winding of the boost inductor is connected to a boost inductor output node 260. The first terminal 254 of the auxiliary winding 244 of the boost inductor is connected to the local circuit ground connection 184. The second terminal 256 of the auxiliary winding of the boost inductor is connected to a first terminal of a current limiting resistor 262. A second terminal of the current limiting resistor is connected to the zero-current detection (ZCD) input 214 of the PFC IC 200. When current is flowing from the second terminal to the first terminal of the main winding to the boost inductor output node, a zero current detection current (IZCD) is induced to flow from the second terminal of the auxiliary winding through the current limiting resistor to the zero current detection (ZCD) input of the PFC IC. Internal circuitry within the PFC IC detects when the current decreases to a sufficiently low value to indicate that current is no longer flowing through the main winding of the boost inductor.

The boost inductor output node 260 is connected to an anode 272 of a PFC circuit output diode 270. The PFC circuit output diode has a cathode 274.

The boost inductor output node 260 is also connected to a drain terminal 282 of an electronic switch 280. In the illustrated circuit, the electronic switch comprises an n-channel enhancement mode metal oxide semiconductor field effect transistor (MOSFET). The electronic switch also has a source terminal 284 and a gate terminal 286. The gate terminal of the electronic switch is connected to the gate drive (GD) output 216 of the PFC IC 200. The source terminal of the electronic switch is connected to a first terminal of a current sensing resistor 290 at a current sensing node 292. A second terminal of the current sensing resistor is connected to the local circuit ground connection 184. The current sensing resistor has a low resistance of, for example, 0.1 ohm such that the current flowing through the current sensing resistor generates a voltage on the current sensing node that is proportional to the magnitude of the current. The voltage generated on the current sensing node is coupled to the current sensing (CS) input 210 of the PFC IC via a current sensing input resistor 294.

The cathode 274 of the PFC circuit output diode 270 is connected to a PFC circuit output node 300 to produce a PFC circuit output voltage ($V_{PFC\_OUT}$). A PFC circuit output filter capacitor 302 is connected between the PFC circuit output node and the local circuit ground connection 184 to filter the power factor output voltage. In the illustrated embodiment, the PFC circuit output filter capacitor is an electrolytic capacitor having a voltage rating of, for example, 500 volts.

The two-stage electronic switching power supply 100 includes a voltage sensing circuit 310 connected across the PFC circuit output filter capacitor 302 between the PFC circuit output node 300 and the local circuit ground connection 184. The voltage sensing circuit includes a first voltage sensing resistor 312 and a second voltage sensing resistor 314, which are connected in series between the PFC circuit output node and the local circuit ground connection. The first voltage sensing resistor is connected between the PFC circuit output node and a voltage sensing node 316. The second voltage sensing resistor is connected between the voltage sensing node and the local circuit ground reference.

A sensed voltage ($V_{SENSE}$) is produced on the voltage sensing node 316. The voltage sensing node is connected to the inverting (INV) input 202 of the PFC IC 200 to provide feedback to the PFC IC proportional to the PFC circuit output voltage. The PFC IC is responsive to the sensed voltage at the voltage sensing node to regulate the voltage on the PFC circuit output node. For example, the resistance values of the first voltage sensing resistor 312 and the second voltage sensing resistor 314 are selected to cause the sensed voltage at the voltage sensing node to be 2.5 volts when the PFC circuit output voltage ($V_{PFC\_OUT}$) on the PFC circuit output node has a selected magnitude. If the PFC circuit output voltage increases above the selected magnitude, the PFC IC adjusts the timing of the signal applied to the gate terminal of the electronic switch to reduce the PFC circuit output voltage. If the PFC circuit output voltage decreases below the selected magnitude, the PFC IC adjusts the timing of the signal applied to the gate terminal of the electronic switch to increase the PFC circuit output voltage.

A feedback compensation capacitor 330 is connected between the inverting (INV) input 202 and the compensation (COMP) output 204 of the PFC IC 200. The feedback compensation capacitor is connected as part of an integration control loop of the PFC IC. The integration control loop of the PFC IC operates to stabilize the output voltage on the PFC circuit output node 300.

The operation of the PFC circuit 114 is well known. Basically, the PFC IC 200 controls the timing of the gate voltage of the electronic switch 280 to selectively turn the electronic switch on and off. The PFC IC compares the sensed voltage ($V_{SENSE}$) applied to the inverting (INV) input 202 from the voltage sensing node 316 to an internal reference voltage (e.g., 2.5 volts in the illustrated embodiment). The PFC IC modifies the timing of the gate drive signal from the gate drive (GD) output 216 to maintain the PFC circuit output voltage at a desired voltage level to thereby cause the sensed voltage to be equal to the internal reference voltage. The PFC IC monitors the current through the electronic switch via voltage on the current sensing (CS) input from the current sensing node 292. The current through the electronic switch is the same current as through the main winding 242 of the boost inductor 240. The PFC IC controls the electronic switch to control the magnitude of the current to conform with a magnitude envelope corresponding to the time-varying magnitude of the voltage on the multiplier (MULT) input 206. In the critical conduction mode of operation, after the PFC IC turns the electronic switch off, the PFC IC does not turn the electronic switch on until the current is close to zero as determined by the current flowing into the zero-current detection (ZCD) input 214.

The output voltage ($V_{PFC\_OUT}$) from the PFC circuit 114 on the PFC circuit output node 300 is provided to a high voltage input terminal 340 of the DC-DC converter circuit 116. The DC-DC converter circuit also has a ground terminal 342 connected to the local circuit ground connection 184. The DC-DC converter circuit also has a component supply voltage terminal 344, which is connected to the output of the low voltage source 226.

The DC-DC converter circuit 116 operates in a conventional manner to convert the unregulated DC voltage on the high voltage input terminal 340 to a regulated DC voltage between a first output terminal 350 and a second output terminal 352 to drive the load 118. In an exemplary DC-DC converter circuit for supplying a plurality of LEDs, the DC-DC converter circuit controls the magnitude of the current flowing through the LEDs to maintain a selected illumination level of the LEDs in the load. For example, the DC-DC converter in the illustrated embodiment may be a switch-mode power supply, which is configured to provide a substantially constant current to the load. The switch-mode power supply operates by generating a high frequency switched DC signal having a variable duty cycle or a variable pulse width. The duty cycle or pulse width of the switched DC signal is controlled via feedback techniques to generate a selected output current.

For the illustrated embodiment, it can be shown that a peak current ($I_{L\_PEAK}$) through the main winding 242 of the boost inductor 240 may be calculated in accordance with the following equation:

$$I_{L\_PEAK} = V_{MULT} \times V_{COMP} \times \text{Gain} = k \times V_{in} \times \sin(\omega t) \qquad (1)$$

As shown in Equation (1), the peak current ($I_{L\_PEAK}$) through the main winding 242 of the boost inductor 240 follows the multiplier signal ($V_{MULT}$) at the multiplier (MULT) input 206 of the PFC IC 200 (e.g., the voltage on the second input voltage divider 234.

If the multiplier signal ($V_{MULT}$) follows instantaneous rectified input voltage ($V_{IN\_RECT}$) at the positive voltage output terminal 180 perfectly, then the peak current ($I_{L\_PEAK}$) will have a perfectly sinusoid envelope. Likewise, an average current ($I_{L\_MAIN\_AVG}$) of the main winding 242 of the boost inductor 240 will have a prefect sinusoid shape. The average current ($I_{L\_PEAK\_AVG}$) of the main winding 242 of the boost inductor 240 is an input line current ($I_{LINE}$) associated with the positive voltage output terminal 180. Since the peak current ($I_{L\_PEAK}$) of the main winding 242 of the boost inductor 240 follows the multiplier signal ($V_{MULT}$) and the average current ($I_{L\_PEAK\_AVG}$) of the main winding 242 of the boost inductor 240 follows the instantaneous rectified input voltage ($V_{IN\_RECT}$) at the positive voltage output terminal 180, the circuit should have a perfect power factor.

Figure 2:
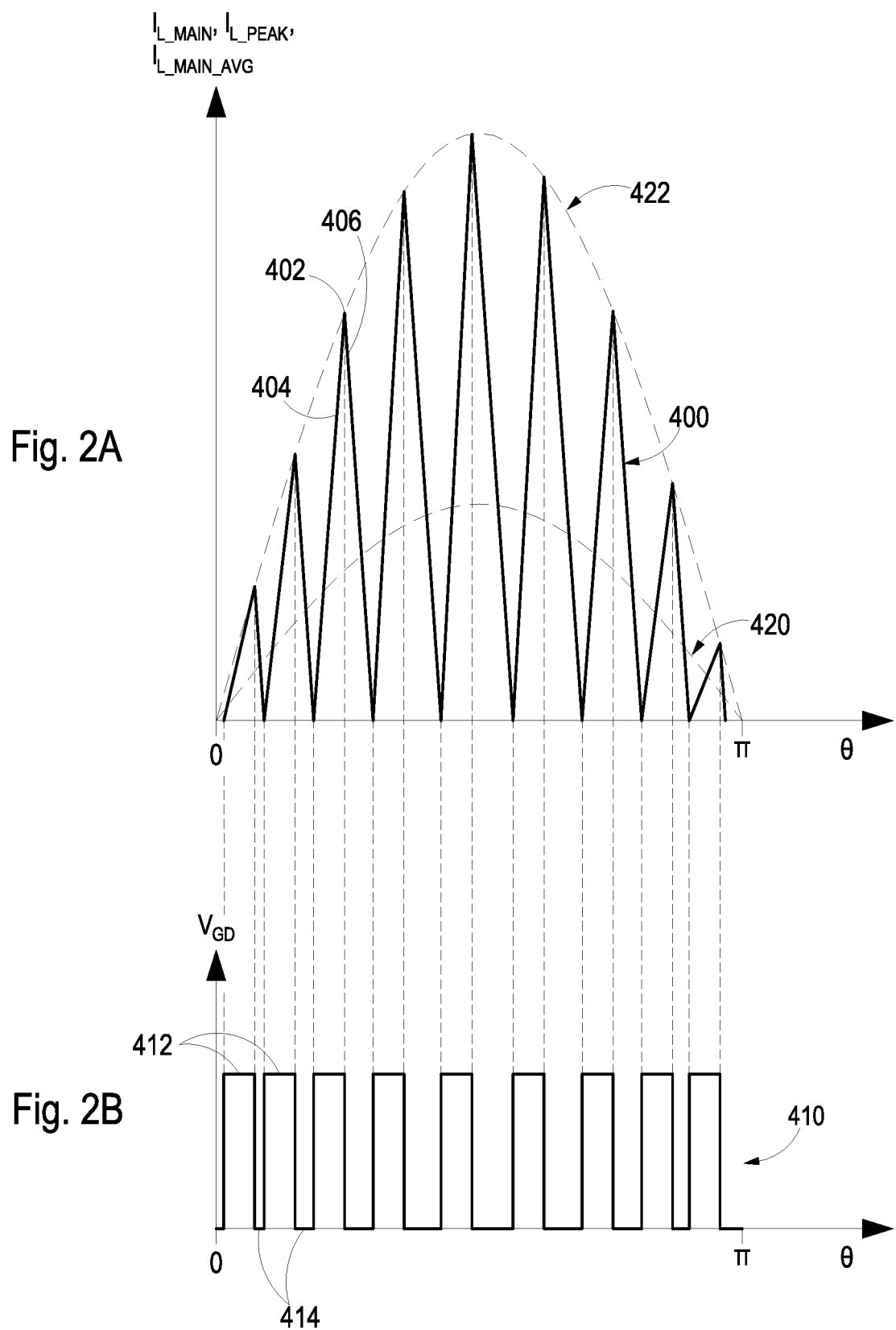
FIG. 2A illustrates a waveform of an inductor current ($I_{L\_PEAK}$) through the main winding of the boost inductor of FIG. 1.
FIG. 2B illustrates a waveform of a gate drive (GD) output of the power factor corrector integrated circuit (PFC IC) of FIG. 1.

In FIG. 2A, a discontinuous winding current waveform 400 represents a current ($I_{L\_MAIN}$) through the main winding 242 of the boost inductor 240 during a half-cycle of a sinusoidal waveform. The winding current waveform comprises a plurality of current pulses 402. Each current pulse comprises an increasing leading edge 404 and a decreasing trailing edge 406. Each leading edge increases at a rate determined by the instantaneous rectified input voltage ($V_{IN\_RECT}$) at the positive reference voltage output terminal 180 of the rectifier circuit 112. The rectified input voltage is applied across the main winding of the boost inductor at a phase angle (θ) when the electronic switch 270 is turned on. As the rectified input voltage increases at increasing phase angles (θ) during the first half of the first half cycle, the rate of change of the leading edges increases.

As further illustrated by the winding current waveform 400 of the main winding 242 in FIG. 2A, the trailing edge of each current pulse decreases almost instantaneously because the electronic switch 270 disconnects the main winding 242 of the boost inductor 240 from the circuit.

As illustrated by a gate drive (GD) waveform 410 in FIG. 2B, the PFC IC turns on the gate drive with a plurality of positive pulses 412 to turn on the electronic switch to enable current to flow through the main winding 242 of the boost inductor 240. In FIG. 2B, each positive pulse 412 represents the on time ($T_{ON}$) of the electronic switch. Each positive pulse is followed by a zero voltage 414, which represents an off time ($T_{OFF}$) of the electronic switch. As described below, when the error signal within the PFC IC is not changing, the on times of the electronic switch are substantially constant as illustrated in FIG. 2B. On the other hand, the off times between the on times vary throughout each half cycle. The off times are greater near the middle of each half-cycle and are smaller near the beginning and the end of each half-cycle.

As further shown in FIG. 2A, the current ($I_{L\_MAIN}$) through the main winding 242 of the boost inductor 240 during each half cycle may be averaged (e.g., the average current ($I_{L\_MAIN\_AVG}$)) as represented by an average current waveform 420. The average current waveform 420 has a perfectly sinusoid shape. Further illustrated is a peak current waveform 422 of the peak current ($I_{L\_PEAK}$) through the main winding 242 of the boost inductor 240. The peak current waveform 422 also has a perfectly sinusoid shape.

Figure 3:
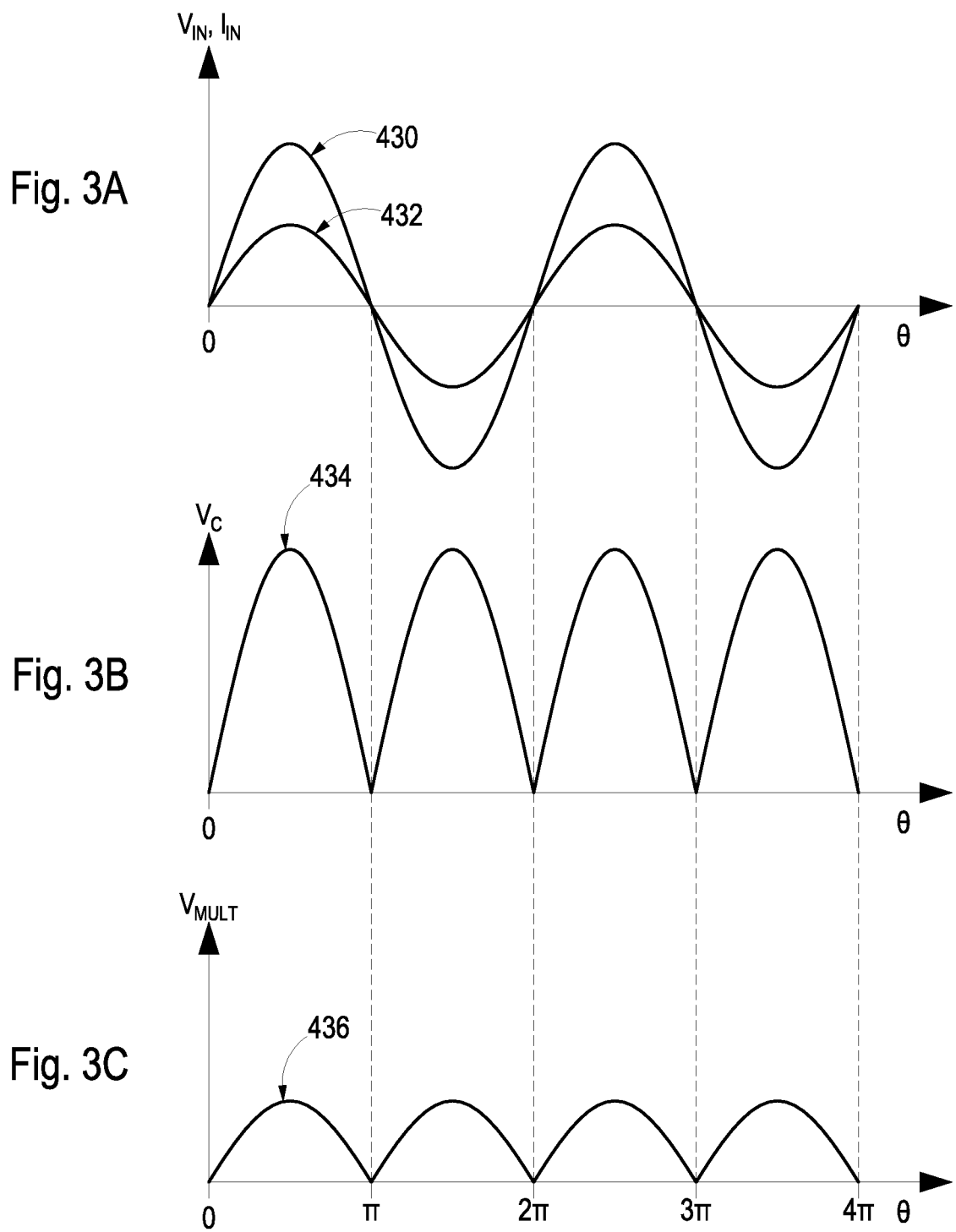
FIG. 3A illustrates a waveform of an AC input voltage ($V_{IN}$) and a waveform of an AC input current ($I_{IN}$) from the AC source of FIG. 1 when the DC load is heavy.
FIG. 3B illustrates a waveform of a capacitor voltage ($V_C$) from the rectifier input filter capacitor of FIG. 1 when the DC load is heavy.
FIG. 3C illustrates a waveform of a multiplier signal ($V_{MULT}$) from the multiplier circuit of FIG. 1 when the DC load is heavy.

FIGS. 3A-3C illustrate the relationships between the input voltage ($V_{IN}$) from the AC source 120, an input current ($I_{IN}$) from the AC source, a voltage ($V_C$) across the rectifier output filter capacitor 186, and the multiplier signal ($V_{MULT}$) when the DC load 118 is under heavy load conditions. The heavy load conditions may be associated with the PFC circuit 114 operating in the critical conduction mode.

In FIG. 3A, an AC voltage waveform 430 from the AC source 120 and an AC current waveform 432 from the AC source are shown under the heavy load conditions. The AV voltage waveform and the AC current waveform each have a perfectly sinusoid shape shown over a first half-cycle. In FIG. 3B, a capacitor voltage waveform 434 of the voltage ($V_C$) across the rectifier output filter capacitor 186 is shown operating under the heavy load conditions. The voltage ($V_C$) across the rectifier output filter capacitor when under the heavy load conditions is substantially the same as the instantaneous rectified input voltage ($V_{IN\_RECT}$) at the positive reference voltage output terminal 180 of the rectifier circuit 112. In FIG. 3C, a multiplier input voltage waveform 436 of the multiplier signal ($V_{MULT}$) is shown operating under the heavy load conditions. The multiplier signal ($V_{MULT}$) is obtained by dividing the voltage ($V_C$) across the rectifier output filter capacitor by the first input voltage divider resistor 232 and the second input voltage divider resistor 234 of the multiplier circuit 230.

As shown in FIGS. 3A-3C, when the DC load 118 is under heavy load conditions, the capacitor voltage waveform 434 will follow the AC voltage waveform 430 and the multiplier input voltage waveform 436 will also follow the AC voltage waveform. Accordingly, under the heavy load conditions the AC current waveform 432 will have a good sinusoid shape. Likewise, when operating under the heavy load conditions the PFC circuit 114 will operate in the critical conduction mode, which is ideal.

Figure 4:
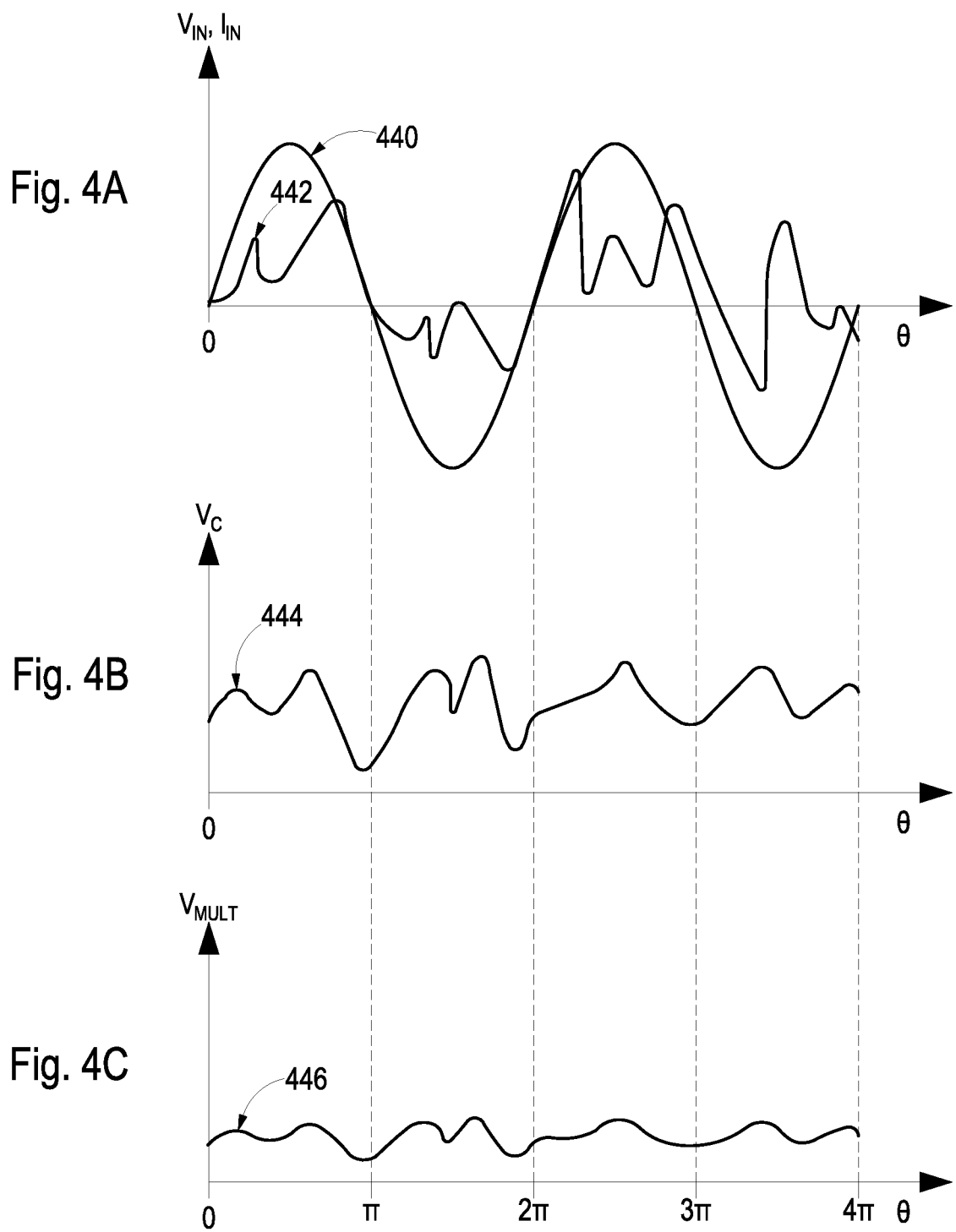
FIG. 4A illustrates a waveform of an AC input voltage ($V_{IN}$) and a waveform of an AC input current ($I_{IN}$) from the AC source of FIG. 1 when the DC load is light.
FIG. 4B illustrates a waveform of a capacitor voltage ($V_C$) from the rectifier input filter capacitor of FIG. 1 when the DC load is light.
FIG. 4C illustrates a waveform of a multiplier signal ($V_{MULT}$) from the multiplier circuit of FIG. 1 when the DC load is light.

FIGS. 4A-4C illustrate the relationships between the input voltage ($V_{IN}$) from the AC source 120, the input current ($I_{IN}$) from the AC source, the voltage ($V_C$) across the rectifier output filter capacitor 186, and the multiplier signal ($V_{MULT}$) when the DC load 118 is operating under light load conditions. The light load conditions may be associated with the PFC circuit 114 operating in the pulsing mode which may cause the DC load 118 to flicker.

In FIG. 4A, an AC voltage waveform 440 associated the AC source 120 is shown operating under the light load conditions. The AC voltage waveform 440 is the same as the AC voltage waveform 430 shown in FIG. 3A under the heavy load conditions. FIG. 4A further shows an AC current waveform 442 associated with the AC source operating under the light load conditions. In FIG. 4B, a capacitor voltage waveform 444 of the voltage ($V_C$) across the rectifier output filter capacitor 186 is shown operating under the light load conditions. The voltage ($V_C$) across the rectifier output filter capacitor of FIG. 1 is dependent upon the load condition of the DC load 118 as illustrated in FIGS. 3B and 4B. In FIG. 4C, a multiplier input voltage waveform 446 of the multiplier signal ($V_{MULT}$) is shown under the light load conditions. The multiplier signal ($V_{MULT}$) is obtained by dividing the voltage ($V_C$) across the rectifier output filter capacitor by the first input voltage divider resistor 232 and the second input voltage divider resistor 234 of the multiplier circuit 230.

As shown in FIGS. 4A-4C, when the DC load 118 is operating under the light load conditions, the rectifier output filter capacitor 186 is unable to discharge fast enough before the next on time ($T_{ON}$) of the electronic switch 280 of the PFC IC 200. As a result, neither the capacitor voltage waveform 444 nor the multiplier input voltage waveform 446 will follow the AC voltage waveform 440. Accordingly, under the light load conditions the PCF circuit 114 will operate in the pulsing mode. The pulsing mode causes the AC current waveform 442 to have an irregular peaky wave shape as shown in FIG. 4A. Operation of the PCF circuit in the pulsing mode is bad because an LED load is very sensitive to variations in the voltage, and as a result the LEDs might flicker.

In the pulsing mode, the electronic switch 280 irregularly pulses on and off. As a result, this causes a huge amount of irregularity in the instantaneous rate of voltage change over time (dv/dt) signal. The irregular instantaneous rate of voltage change over time signal causes a large amount of irregular common mode noise. Irregular common mode noise is bad because it will circulate through the circuit and disturbs the DC-DC convertor circuit 116. For example, when the output of the second stage is an LED load operating under the light load conditions the irregular noise could confuse the current control loop on the DC-DC converter circuit and cause the output current to the LED load to be unstable, thus causing the LED load to flicker. Flickering of the LED load occurs when the pulsing noise frequency is very low (e.g., less than 30 Hz). In the lighting industry it is unacceptable for the load to be unstable under any dimming condition (e.g., anything from heavy load conditions and light load conditions) for a high-quality power supply.

Figure 5:
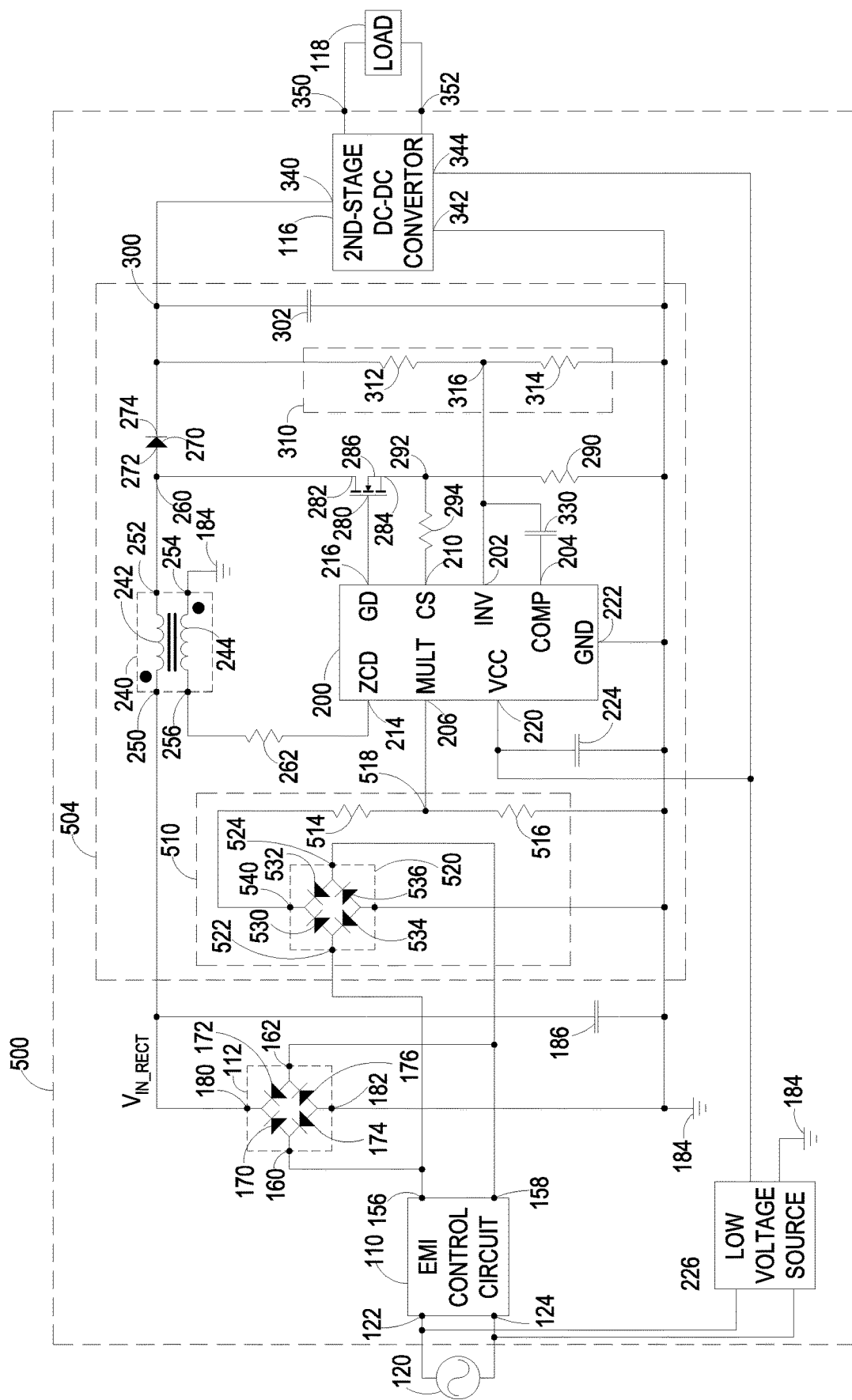
FIG. 5 illustrates an improved version of the two-stage electronic switching power supply of FIG. 1 in which the multiplier circuit is decoupled from the rectifier output filter capacitor and is coupled across the input of the rectifier of FIG. 1.

FIG. 5 illustrates an improved two-stage electronic switching power supply 500 in accordance with a first embodiment of the present disclosure. The improved two-stage electronic switching power supply 500 improves the output stability for light load conditions. The improved two-stage electronic switching power supply of FIG. 5 is similar to the previously described two-stage electronic switching power supply 100 of FIG. 1 and like elements are numbered the same as in FIG. 1. Unlike the previously described two-stage electronic switching power supply of FIG. 1, the improved two-stage electronic switching power supply of FIG. 5 includes an improved power factor correction (PFC) circuit 504 that includes an improved multiplier circuit 510.

Figure 6:
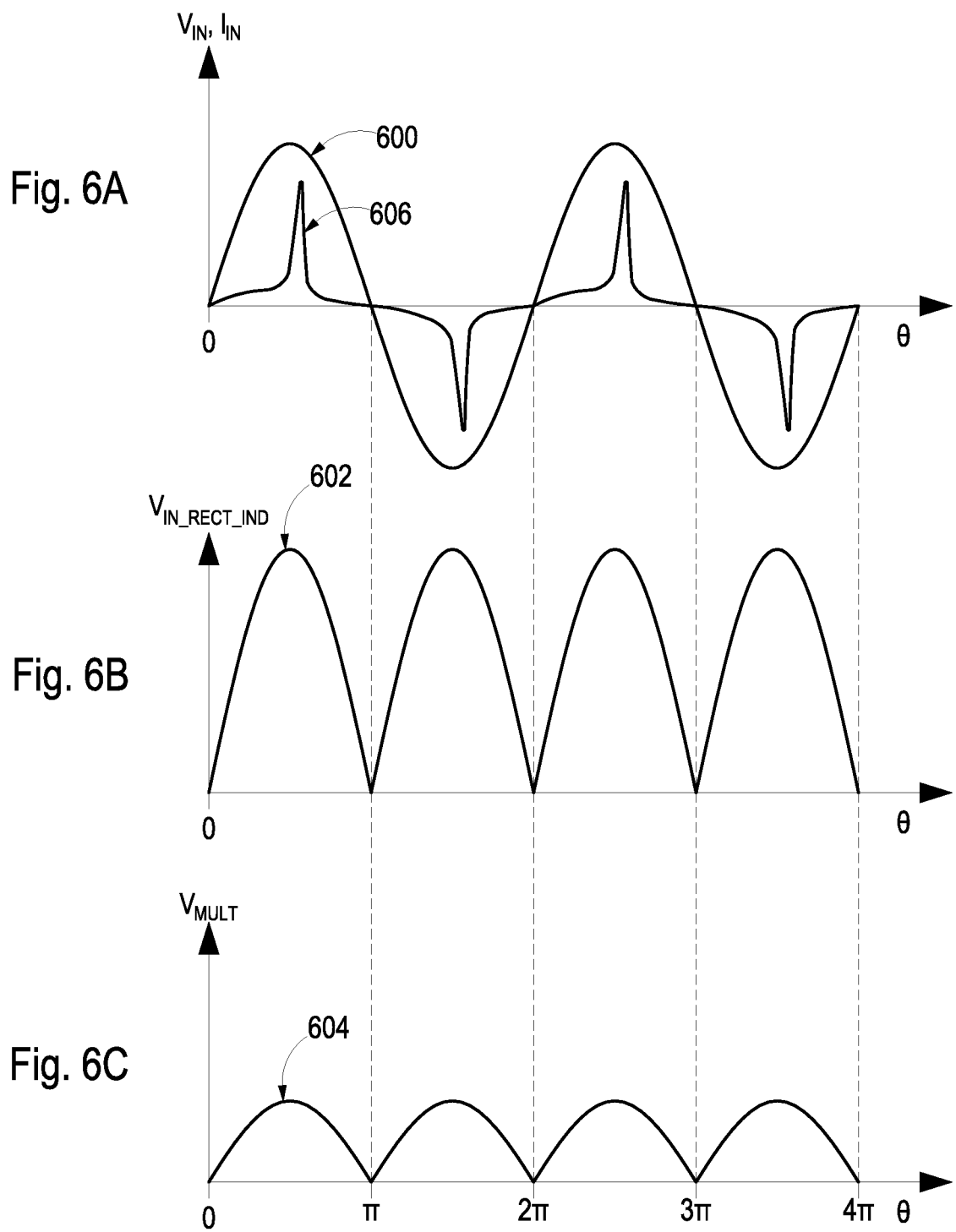
FIG. 6A illustrates a waveform of an AC input voltage ($V_{IN}$) and a waveform of an AC input current ($I_{IN}$) from the AC source of FIG. 5 when the DC load is light.
FIG. 6B illustrates a waveform of an independent positive voltage ($V_{IN\_RECT\_IND}$) output terminal of the independent input bridge rectifier of FIG. 5 when the DC load is light.
FIG. 6C illustrates a waveform of the independent multiplier signal ($V_{MULT\_IND}$) from the multiplier circuit of FIG. 5 when the DC load is light.

The improved multiplier circuit 510 solves the instability problem associated with the power supply 100 of FIG. 1 when subject to the light load conditions. The improved multiplier circuit 510 provides an independent multiplier signal ($V_{MULT\_IND}$) to the PFC IC 200 so that the PFC IC can control the output current based upon the signals from the AC source 120 which operates regularly following a predicable pulsing waveform, as shown in FIG. 6A. If a pulsing frequency through the PFC circuit 114 of the power supply 500 is high enough (e.g., greater than or equal to 60 Hz), then any change to the output current of the DC-DC converter circuit 116 due to this 'pulsing noise' will not be visible to the human eye.

As shown in FIG. 5, the improved multiplier circuit 510 is decoupled from the rectifier output filter capacitor 186 in order to attain independence for the independent multiplier signal ($V_{MULT\_IND}$). This means that the voltage ($V_C$) across the rectifier output filter capacitor is no longer used for generating the independent multiplier signal to the multiplier (MULT) input 206 of the PFC IC 200.

As shown in FIG. 5, the improved multiplier circuit 510 includes a first input voltage divider resistor 514 and a second input voltage divider resistor 516. In order to establish independence or isolation from the voltage ($V_C$) across the rectifier output filter capacitor 186, the improved multiplier circuit further includes an independent input bridge rectifier 520. The independent input bridge rectifier 520 may also be referred to herein as a second rectifier 520.

The independent input bridge rectifier 520 is connected to the power supply 500 similar to the rectifier circuit 112 as described above with regard to FIG. 1. The AC power passes through the EMI control circuit 110 and is provided across a first input terminal 522 and a second input terminal 524 of the independent input bridge rectifier. The first input terminal 522 is coupled to the first input terminal 160 of the rectifier circuit 112. The second input terminal 524 is coupled to the second input terminal 162 of the rectifier circuit 112. The independent input bridge rectifier is configured as a full-wave bridge rectifier circuit that comprises a first rectifier diode 530, a second rectifier diode 532, a third rectifier diode 534, and a fourth rectifier diode 536, which are connected as shown.

The first input terminal 522 of the independent input bridge rectifier 520 is connected to the anode of the first rectifier diode 530 and to the cathode of the third rectifier diode 534. The second input terminal 524 of the independent input bridge rectifier is connected to the anode of the second rectifier diode 532 and to the cathode of the fourth rectifier diode 536. The cathodes of the first rectifier diode 530 and the second rectifier diode 532 are commonly connected to an independent positive voltage ($V_{IN\_RECT\_IND}$) output terminal 540 of the independent input bridge rectifier. The anodes of the third rectifier diode 534 and the fourth rectifier diode 536 are commonly connected to the local circuit ground connection 184.

The first input voltage divider resistor 514 and the second input voltage divider resistor 516 are connected in series between the independent positive voltage output terminal 540 of the independent input bridge rectifier 520 and the local circuit ground connection 184. The two resistors are connected at a common node 518 to provide a voltage (e.g., the independent multiplier signal) proportional to the time-varying output voltage from the independent input bridge rectifier at the common node. The common node is connected to the multiplier (MULT) input 206 of the PFC IC 200.

The independent input bridge rectifier 520 does not have an energy storing capacitor coupled to the independent positive voltage ($V_{IN\_RECT\_IND}$) output terminal. The independent multiplier signal ($V_{MULT\_IND}$) produced by the first and second input voltage divider resistors 514, 516 is thus configured to strictly follow the input voltage ($V_{IN}$) regardless of a load condition on the DC load 118. By providing such a reliable independent multiplier signal ($V_{MULT\_IND}$) to the PFC IC 200, a predicable pulsing input current ($I_{IN}$) waveform will be obtained for the light load conditions as shown in FIG. 6A.

FIGS. 6A-6C illustrate the relationships between the input voltage ($V_{IN}$) from the AC source 120, the input current ($I_{IN}$) from the AC source, the voltage ($V_{IN\_RECT\_IND}$) at the independent positive voltage output terminal 540 of the independent input bridge rectifier 520, and the independent multiplier signal ($V_{MULT\_IND}$) for the power supply 500 when the DC load 118 is under light load conditions.

In FIG. 6A, an AC voltage waveform 600 of an input voltage ($V_{IN}$) associated the AC source 120 of FIG. 5 is shown operating under the light load conditions. The AC voltage waveform 600 is the same as the AC voltage waveform 430 as shown in FIG. 3A for the heavy load conditions as applied to the power supply 100 of FIG. 1 and is also the same as the AC voltage waveform 440 as shown in FIG. 4A for light load conditions as applied to the power supply 100 of FIG. 1. In FIG. 6B, a rectified input voltage waveform 602 of the voltage ($V_{IN\_RECT\_IND}$) at the independent positive reference voltage output terminal 540 of the independent input bridge rectifier is shown operating under the light load conditions. In FIG. 6C, a multiplier input voltage waveform 604 of the independent multiplier signal ($V_{MULT\_IND}$) is shown operating under the light load conditions. The independent multiplier signal ($V_{MULT\_IND}$) is obtained irrespective of the voltage ($V_C$) across the rectifier output filter capacitor 186. The AC voltage waveform 600, the rectified input voltage waveform 602, and the multiplier input voltage waveform 604 are all sinusoid shaped.

In FIG. 6A, a predicable pulsing input current waveform 606 of the input current ($I_{IN}$) associated with the AC source 120 of the power supply 500 is shown operating under the light load conditions. The predicable pulsing input current waveform has a predictable periodic peaked shape. The independent multiplier signal ($V_{MULT\_IND}$) always follows the input voltage ($V_{IN}$) associated the AC source because the multiplier circuit 510 operates independently of the voltage ($V_C$) across the rectifier output filter capacitor 186. The pulsing frequency of the input voltage associated with the AC source is typically 60 Hz in the United States. Accordingly, the PCF circuit 112 is forced into a regularly or periodically pulsing mode (e.g., operating at 60 Hz) when the DC load 118 operates under the light load conditions.

As shown by the AC current waveform 606 of FIG. 6A, the result of the improved multiplier circuit 510 of FIG. 5 when the PFC circuit 114 is subject to the light load conditions is that the electronic switch 280 will regularly pulse at approximately 60 Hz, periodic. Accordingly, the improved multiplier circuit results in a regular, rather than irregular, pulsing of the electronic switch 280 when operating under the light load conditions. This results in an improvement to the stability of the second stage DC-DC converter circuit 116 when the DC load 118 is operating under the light load conditions. The only possible low frequency noise that is passed by the PFC circuit 114 to the DC-DC converter circuit is 60 Hz predictable instantaneous rate of voltage change over time (dv/dt) common noise.

Figure 7:
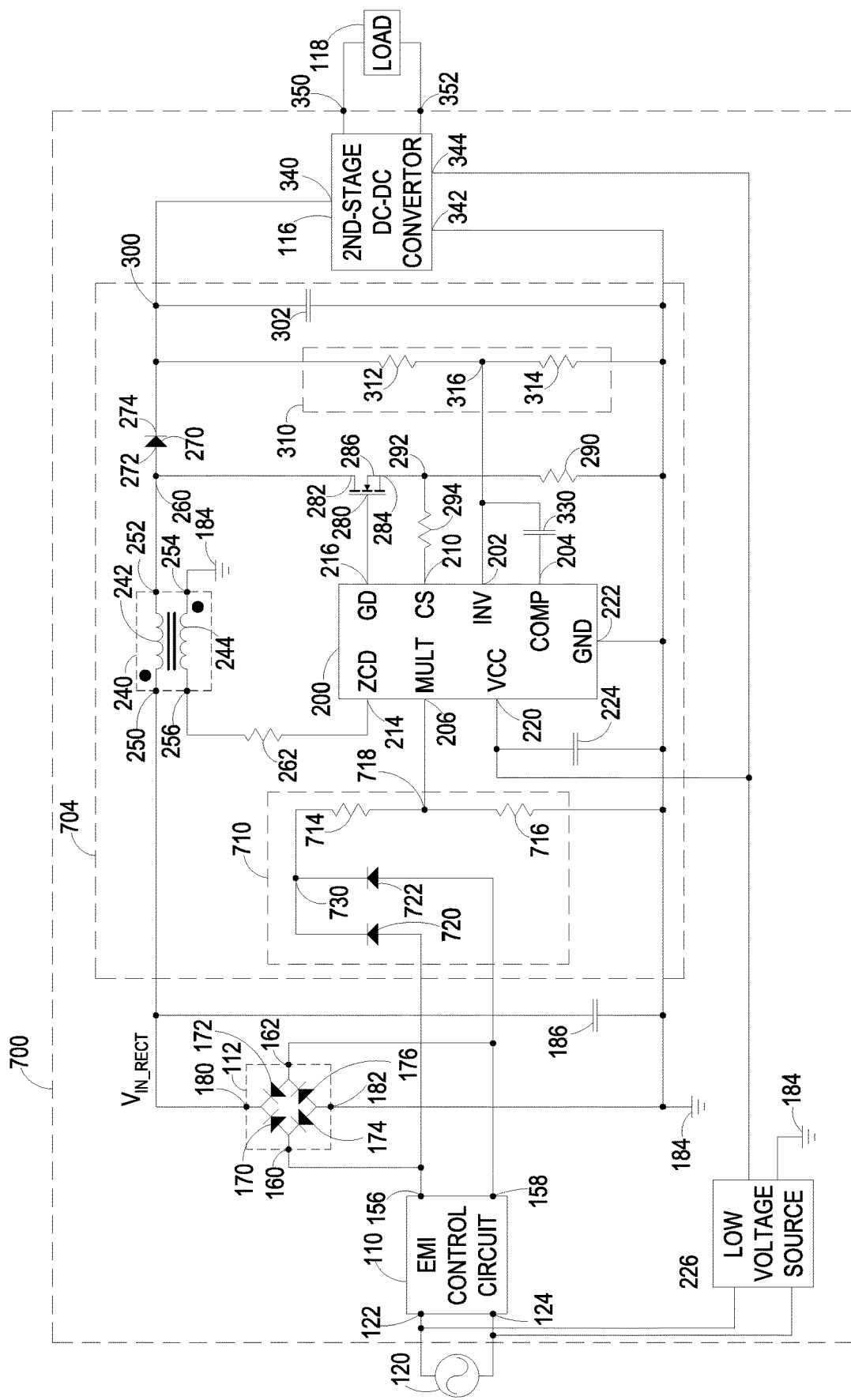
FIG. 7 illustrates an improved version of the two-stage electronic switching power supply of FIG. 1 in which the multiplier circuit is decoupled from the rectifier output filter capacitor and is coupled across the input of the rectifier of FIG. 1.

FIG. 7 illustrates an improved two-stage electronic switching power supply 700 in accordance with a second embodiment of the present disclosure. The improved two-stage electronic switching power supply 700 improves the output stability for light load conditions. The improved two-stage electronic switching power supply of FIG. 7 is similar to the previously described two-stage electronic switching power supply 100 of FIG. 1 and like elements are numbered the same as in FIG. 1. Unlike the previously described two-stage electronic switching power supply of FIG. 1, the improved two-stage electronic switching power supply of FIG. 7 includes an improved power factor correction (PFC) circuit 704 that includes an improved multiplier circuit 710. The improved multiplier circuit 710 generates an independent multiplier signal ($V_{MULT\_IND}$) to be provided to the multiplier (MULT) input 206 of the PFC IC 200. The improved multiplier circuit 710 is a lower cost and simpler circuit than the improved multiplier circuit 510 of FIG. 5. The improved multiplier circuit 710 improves the output stability similar to and/or as well as the improved multiplier circuit 510.

As shown in FIG. 7, the improved multiplier circuit 710 is decoupled from the rectifier output filter capacitor 186 in order to enable the independence of the independent multiplier signal. This means that the voltage ($V_C$) across the rectifier output filter capacitor is no longer used to provide the multiplier signal to the multiplier (MULT) input 206 of the PFC IC 200.

As shown in FIG. 7, the improved multiplier circuit 710 includes a first input voltage divider resistor 714, a second input voltage divider resistor 716, a first rectifier diode 720, and a second rectifier diode 722. An anode of the first rectifier diode 720 is coupled to the first input terminal 160 of the rectifier circuit 112. An anode of the second rectifier diode 722 is coupled to the second input terminal 162 of the rectifier circuit 112. The cathodes of the first and second rectifier diodes 720, 722 are connected to an independent positive voltage output terminal 530. The first and second rectifier diodes 720, 722 piggy back off of the third and fourth rectifier diodes 174, 176 of the rectifier circuit 112 in order to create an independent bridge rectifier similar to the independent input bridge rectifier 520 of FIG. 5.

The first input voltage divider resistor 714 and the second input voltage divider resistor 716 are connected in series between the independent positive voltage output terminal 730 and the local circuit ground connection 184. The two resistors are connected at a common node 718 to provide a voltage (e.g., the independent multiplier signal) proportional to the time-varying output voltage from the first and second rectifier diodes 720, 722 at the common node. The common node is connected to the multiplier (MULT) input 206 of the PFC IC 200.

When under light load conditions the first rectifier diode 170 and the second rectifier diode 172 of the rectifier circuit 112 might stop conducting due to the rectifier output filter capacitor 186 not fully discharging. Based on the improved multiplier circuit 710 configuration, the third rectifier diode 174 and the fourth rectifier diode 176 of the rectifier circuit 112 and the first rectifier diode 720 and the second rectifier diode 722 will continue to provide an independent input for the first and second voltage divider resistors 714, 716 at all times. This configuration causes the multiplier signal ($V_{MULT\_IND}$) to strictly follow the input voltage waveform at all times (e.g., the AC voltage waveform 600 as shown in FIG. 6A).

Figure 8:
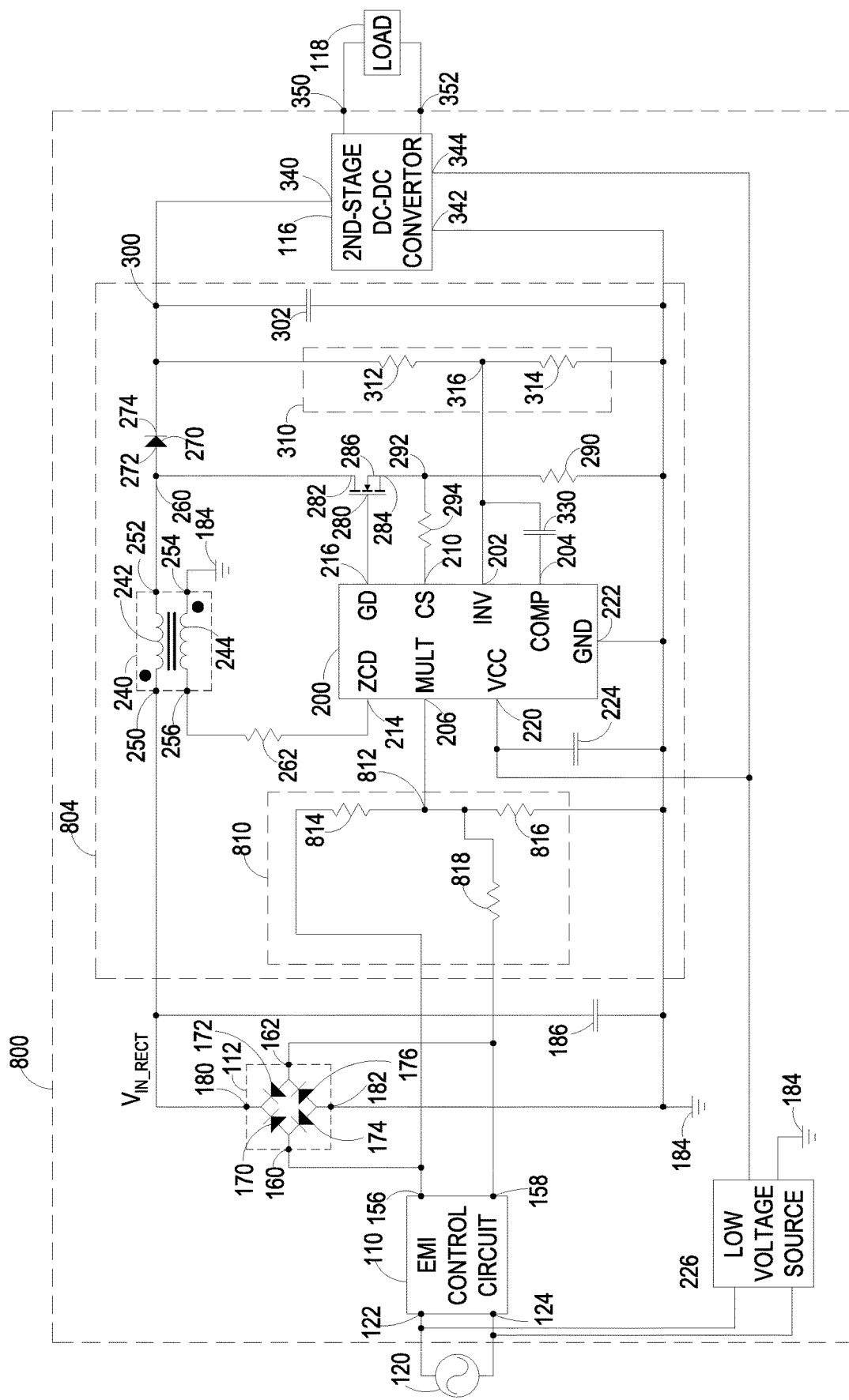
FIG. 8 illustrates an improved version of the two-stage electronic switching power supply of FIG. 1 in which the multiplier circuit is decoupled from the rectifier output filter capacitor and is coupled across the input of the rectifier of FIG. 1.

FIG. 8 illustrates an improved two-stage electronic switching power supply 800 in accordance with a third embodiment of the present disclosure. The improved two-stage electronic switching power supply 800 improves the output stability for light load conditions. The improved two-stage electronic switching power supply of FIG. 8 is similar to the previously described two-stage electronic switching power supply 100 of FIG. 1 and like elements are numbered the same as in FIG. 1. Unlike the previously described two-stage electronic switching power supply of FIG. 1, the improved two-stage electronic switching power supply of FIG. 8 includes an improved power factor correction (PFC) circuit 804 that includes an improved multiplier circuit 810. The improved multiplier circuit 810 generates an independent multiplier signal ($V_{MULT\_IND}$) to be provided to the multiplier signal to the multiplier (MULT) input 206 of the PFC IC 200. The improved multiplier circuit 810 is a lower cost and simpler circuit than the improved multiplier circuit 510 of FIG. 5. The improved multiplier circuit 810 improves the output stability similar to and/or as well as the improved multiplier circuit 510.

As shown in FIG. 8, the improved multiplier circuit 810 is decoupled from the rectifier output filter capacitor 186 in order to allow for independence of the independent multiplier signal ($V_{MULT\_IND}$). This means that the voltage ($V_C$) across the rectifier output filter capacitor is no longer used to provide the multiplier signal to the multiplier (MULT) input 206 of the PFC IC 200.

As shown in FIG. 8, the improved multiplier circuit 810 includes a common node 812, a first input voltage divider resistor 814, a second input voltage divider resistor 816, and a third input voltage divider resistor 818. The common node 812 is coupled to the multiplier (MULT) input 206 of the PFC IC 200. The first input voltage divider resistor 814 is coupled between the first input terminal 160 of the rectifier circuit 112 and the common node. The second input voltage divider resistor 816 is coupled between the common node and the local circuit ground connection 184. The third input voltage divider resistor 818 is coupled between the second input terminal 162 of the rectifier circuit 112 and the common node.

When under light load conditions the first rectifier diode 170 and the second rectifier diode 172 of the rectifier circuit 112 might stop conducting due to the rectifier output filter capacitor 186 not fully discharging. The third rectifier diode 174 and the fourth rectifier diode 176 of the rectifier circuit 112 will always conduct no matter what the load condition is.

When the AC voltage waveform of the AC source 120 is in a positive cycle the fourth rectifier diode 176 conducts and the first and second input voltage divider resistors 814, 816 provide a current path for the AC source 120. When the AC voltage waveform of the AC source 120 is in a negative cycle the third rectifier diode 174 conducts and the second and third input voltage divider resistors 816, 818 provide a current path for the AC source 120. As a result, the voltage on the second input voltage resistor 816 (e.g., the independent multiplier signal) will always follow the wave shape of the AC voltage waveform of the AC source. The independent multiplier signal will also, incidentally, be independent from any load condition of the DC load 118 and independent from any operating condition of the PFC circuit 114 and DC-DC converter circuit 116.

When the first input voltage divider resistor 814 and the third input voltage divider resistor 818 have equivalent resistance values, then the improved multiplier circuit 810 of FIG. 8 will function the same as (or equivalent to) the improved multiplier circuit 510 of FIG. 5 and the improved multiplier circuit 710 of FIG. 7. An additional benefit of these circuits is that the regular pulsing of the PFC circuit 114 will also improve the prevention of EMI due to the single pulsing frequency from the AC source 120.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims. The phrase "in one embodiment," as used herein does not necessarily refer to the same embodiment, although it may.

The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A power supply for providing power to a load, the power supply comprising:
    a main rectifier having first and second rectifier input terminals configured to be coupled to an alternating current (AC) power source, the main rectifier configured to convert AC power from the AC power source into a first direct current (DC) power signal at first and second rectifier output terminals;
    an energy storage device coupled across the first and second rectifier output terminals; a DC-DC power converter comprising an integrated circuit (IC) and configured to convert the first DC power signal into a second DC power signal at an output of the DC-DC power converter in response to a multiplier signal received at a multiplier input of the IC; and
    a multiplier input circuit comprising:
    a second rectifier coupled across the first and second rectifier input terminals of the main rectifier,
    first and second input voltage divider resistors coupled in series between first and second outputs of the second rectifier, wherein the first and second input voltage divider resistors are coupled together at a common node,
    wherein the multiplier input circuit is configured to provide the multiplier signal to the multiplier input of the IC, and
    wherein the multiplier input circuit is decoupled from the energy storage device via the main rectifier.

2. The power supply of claim 1, wherein the multiplier signal corresponds to the AC power from the AC power source independently of a load condition.

3. The power supply of claim 2, wherein the DC-DC power converter is a power factor correction (PFC) circuit comprising an inductor coupled on a first end to a first end of the energy storage device, and a switching element coupled between a second end of the inductor and the second rectifier output terminal.

4. The power supply of claim 3, wherein:
    the multiplier input circuit forces the PFC circuit into periodic pulsing mode.

5. The power supply of claim 1, wherein:
    the common node is coupled to the multiplier input of the IC.

6. The power supply of claim 1, further comprising:
    a second DC-DC power converter coupled to receive the second DC power signal and configured to produce a regulated third DC power signal at an output of the power supply.

7. The power supply of claim 6, wherein the output of the power supply is coupled via first and second output terminals to a DC load.

8. A power supply for providing power to a load, the power supply comprising:
    a main rectifier having first and second rectifier input terminals configured to be coupled to an alternating current (AC) power source, the main rectifier configured to convert AC power from the AC power source into a first direct current (DC) power signal at first and second rectifier output terminals;
    an energy storage device coupled across the first and second rectifier output terminals; a DC-DC power converter comprising an integrated circuit (IC) and configured to convert the first DC power signal into a second DC power signal at an output of the DC-DC power converter in response to a multiplier signal received at a multiplier input of the IC; and a multiplier input circuit comprising:
a first input voltage divider resistor coupled between the first rectifier input terminal of the main rectifier and a common node of the multiplier circuit,
a second input voltage divider resistor coupled between the common node and the second rectifier output terminal of the main rectifier,
a third input voltage divider resistor coupled between the second rectifier input terminal of the main rectifier and the common node,
wherein the multiplier input circuit is configured to provide the multiplier signal to the multiplier input of the IC, and
wherein the multiplier input circuit is decoupled from the energy storage device via the main rectifier.

9. The power supply of claim 8, wherein the multiplier signal corresponds to the AC power from the AC power source independently of a load condition.

10. The power supply of claim 9, wherein the DC-DC power converter is a power factor correction (PFC) circuit comprising an inductor coupled on a first end to a first end of the energy storage device, and a switching element coupled between a second end of the inductor and the second rectifier output terminal.

11. The power supply of claim 10, wherein:
the multiplier input circuit forces the PFC circuit into periodic pulsing mode.

12. The power supply of claim 8, wherein:
the common node is coupled to the multiplier input of the IC.

13. The power supply of claim 8, wherein:
the first and second voltage divider resistors operate as a voltage divider during a positive half-cycle of the AC power from the AC power source; and
the second and third voltage divider resistors operate as the voltage divider during a negative half-cycle of the AC power from the AC power source.

14. The power supply of claim 8, further comprising:
a second DC-DC power converter coupled to receive the second DC power signal and configured to produce a regulated third DC power signal at an output of the power supply.

15. The power supply of claim 14, wherein the output of the power supply is coupled via first and second output terminals to a DC load.

* * * * *